United States Patent [19]
Costa et al.

[11] Patent Number: 6,045,103
[45] Date of Patent: Apr. 4, 2000

[54] MULTIPLE AXIS BRACKET WITH KEYED MOUNT

[75] Inventors: Richard Sander Costa, Bedminster, N.J.; Hung D. Mach, Flushing, N.Y.; James Gordon Turner, Mine Hill, N.J.

[73] Assignee: Lucent Technologies, Inc., Murray Hill, N.J.

[21] Appl. No.: 09/118,746

[22] Filed: Jul. 17, 1998

[51] Int. Cl.[7] .................................................. E04G 3/00
[52] U.S. Cl. ..................... 248/278.1; 248/279.1; 248/282.1; 211/119.06
[58] Field of Search .................. 248/278.1, 552, 248/279.1, 282.1, 283.1, 284.1, 285.1, 286.1, 287.1, 913; 211/119.06, 98

[56] References Cited

U.S. PATENT DOCUMENTS

| | | | |
|---|---|---|---|
| 5,285,938 | 2/1994 | Fauchald | 428/279.1 |
| 5,713,549 | 2/1998 | Shich | 248/284.1 |
| 5,743,503 | 4/1998 | Voeller et al. | 248/284.1 |
| 5,853,158 | 12/1998 | Riggle | 248/278.1 |

*Primary Examiner*—Timothy V. Eley
*Assistant Examiner*—Willie Berry, Jr.
*Attorney, Agent, or Firm*—Gibbons, Del Deo, Dolan, Griffinger & Vecchione

[57] ABSTRACT

A bracket for mounting electronic instruments, such as antennas, on a building or pole or wall, is able to pivot in two perpendicular planes and be securely locked in position. The bracket can slide from an extended position to a retracted position to conserve space. A key plate allows the instrument to be removed from the bracket, and another instrument quickly installed without needing realignment. A screw is provided for fine angular adjustment.

16 Claims, 4 Drawing Sheets

MULTIPLE AXIS BRACKET WITH KEYED MOUNT

FIELD OF THE INVENTION

This invention relates to the field of brackets, and more particularly to a mounting bracket for electronic instruments, able to pivot in two perpendicular planes.

BACKGROUND OF THE INVENTION

Certain types of electronic instruments are typically mounted on a building or pole or wall, and must be pointed in a given direction to function. With PCS and other wireless communication systems, antennas are aligned to provide coverage in predetermined sectors. Mounting brackets currently in use often vibrate or move out of alignment. Typically, two people are required to mount the instrument—one to support it, and another to secure screws. Aiming the instrument in the given direction is difficult and imprecise, and the locking is insecure. In the event that the instrument malfunctions, replacement is laborious, and the instrument needs realignment. The instrument is not reasonably secure against theft.

Accordingly, there is a need to provide a mounting bracket wherein one person alone can install and remove the instrument. A bracket that can be quickly and precisely aimed in the given direction, and locked. A bracket that is sturdy and vibration-free, yet cost-effective to manufacture. There is a need to provide for replacing the instrument easily, and not having to redirect it. There is a need to discourage theft.

SUMMARY OF THE INVENTION

In accordance with the present invention, there is provided a bracket for mounting an antenna upon a foundation. The bracket comprises a base member having a bottom plate for attachment to the foundation. A base plate is attached to the bottom plate and extends from a first end to an opposite second end. The bracket includes an intermediate member having a lower plate, and a pair of generally parallel flanges. The flanges are spaced apart, and extend generally perpendicularly from the lower plate. The intermediate member lower plate is pivotally attached to the base member base plate. The bracket also includes a support member having a pair of generally parallel flanges spaced apart. The support member flanges are pivotally attached to the intermediate member flanges. Keyed mounting is provided for mounting the instrument onto the support member.

BRIEF DESCRIPTION OF THE DRAWING

A more complete understanding of the present invention may be obtained from consideration of the following description in conjunction with the drawings, in which.

DESCRIPTION OF THE PREFERRED EMBODIMENTS

Figure 1:
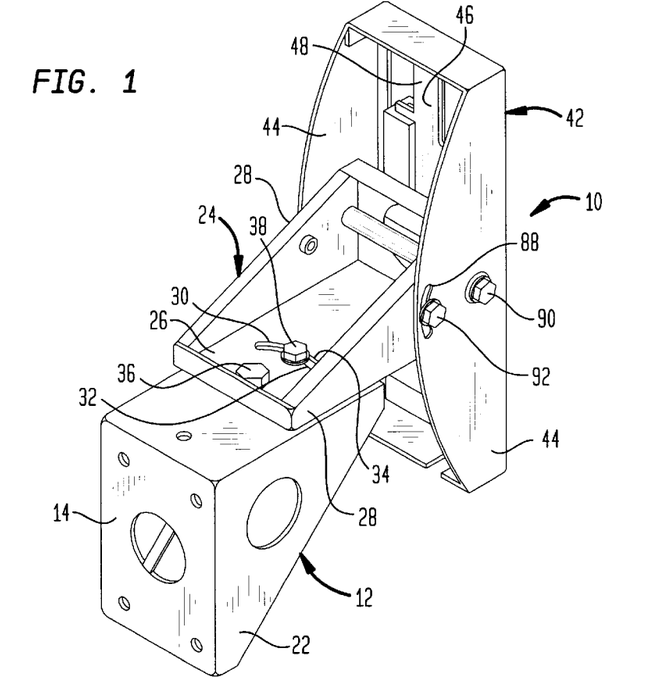
FIG. 1 is a perspective view of a multiple axis bracket constructed in accordance with the invention, in the extended position.
Figure 3:
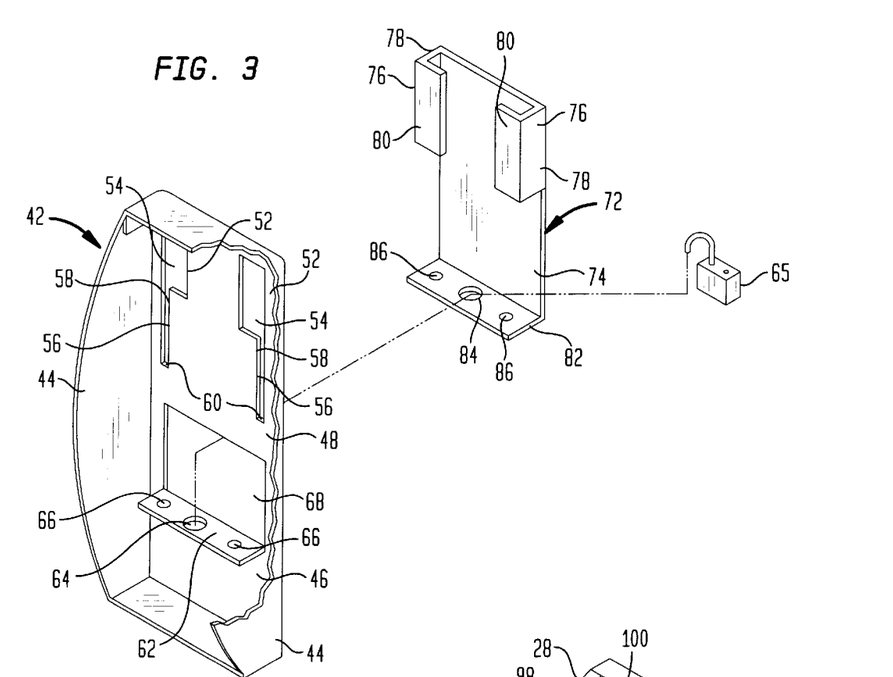
FIG. 3 is a perspective view of a support member and key plate constructed in accordance with the invention.

Referring now to the drawings, and especially to FIGS. 1 and 3, a multiple axis bracket 10 for mounting an electronic instrument 9, such as an antenna, upon a foundation, such as a building, poll or wall, is shown. The bracket 10 comprises a base member 12, having a bottom plate 14 for attachment to the foundation (not shown). The base member 12 also has a base plate 16 attached generally perpendicularly to the bottom plate 14 and extending from a first end 18 adjacent the bottom plate 14 to an opposite second end 20. Gussets 22 may be added between the bottom plate 14 and the base plate 16 for strength.

The bracket 10 has an intermediate member 24, with a lower plate 26. The lower plate 26 has a pair of generally parallel flanges 28, spaced apart, and extending generally perpendicularly from the lower plate 26. The intermediate member lower plate 26 is juxtaposed against the base member base plate 16 in a partly overlapping extended position, as shown in FIG. 1.

The lower plate 26 and the base plate 16 include a first arcuate slot 30 with a first arc center. The first arcuate slot 30 can be disposed either in the lower plate 26, or in the base plate 16, or in both plates. The first arcuate slot 30 has a concave edge 32 facing the arc center, and an opposite convex edge 34.

Figure 6:
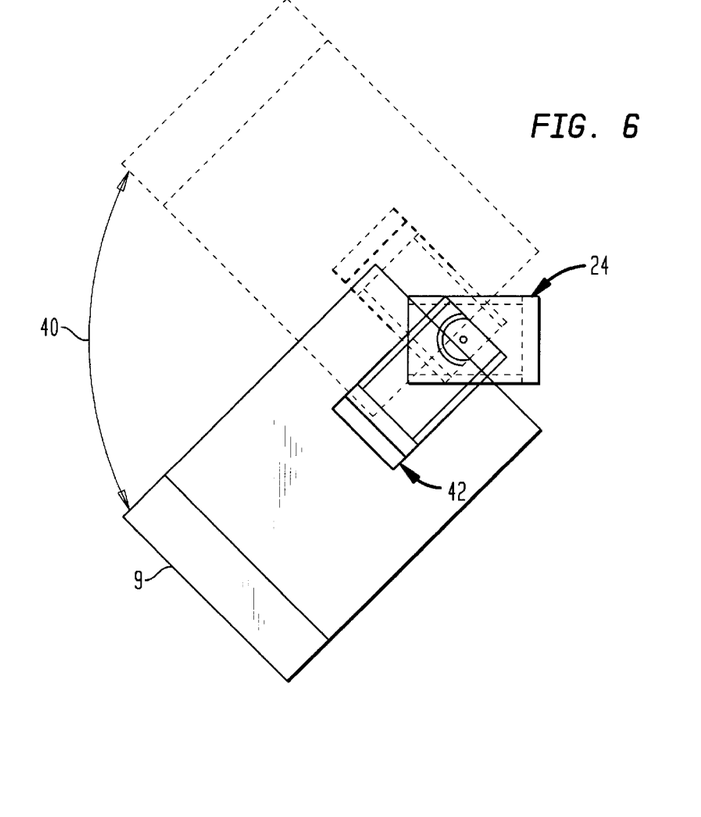
FIG. 6 is a top plan view of the multiple axis bracket of FIG. 5 with the instrument mounted thereon, and pivoting within the first plane.

A first pivotal means is provided for pivotal attachment of the intermediate member lower plate 26 to the base member base plate 16. Typically, the first pivotal means includes a first pivot fastener 36, which is shown as a bolt with a nut and washers, but can also be a stud welded on, the stud having threads and a nut, or a groove and a snap ring. The first pivot fastener 36 pivotally attaches the lower plate 26 to the base plate 16 at the first arc center. In this manner, the lower plate 26 will be pivoted in a first plane parallel to the base plate 16, as shown by arrow 40 in FIG. 6. A first locking fastener 38 slidingly engages the first arcuate slot 30. The first locking fastener 38 releasably locks the lower plate 26 to the base plate 16. This allows adjusting a base angle of the intermediate member 24 with respect to the base member 12 and selective locking of the base angle;

The bracket 10 also comprises a support member 42 having a pair of generally parallel flanges 44 spaced apart. The support member 42 includes a web plate 46 extending between the flanges 44. The web plate 46 has an inside surface 48 adjacent the flanges 44 and an opposite outside surface 50. The web plate 46 has two keyholes 52 therethrough. The keyholes 52 each have an enlarged portion 54 and a slot 56 extending from a proximal end 58 communicating with the enlarged portion 54 to a distal end 60 away from the enlarged portion 54. The keyholes 52 are disposed collaterally and generally parallel to each other. The web plate 46 has a lug 62 extending generally perpendicularly from the inside surface 48. The lug 62 has at least one hole 64 therethrough, the hole size being sufficient to accommodate a padlock 65. Typically, the lug 62 will also have two additional, smaller holes 66 for fasteners. The web plate 46 also has an aperture 68 therethrough disposed alongside the lug 62, specifically above the lug 62, and below the keyholes 52, as shown in FIG. 3.

The bracket 10 further comprises a key plate 70 for attachment to the instrument 9. The key plate 70 has an inside surface 72 adjacent the instrument 9 and an opposite outside surface 74. The key plate 70 has two keys 76. Each key 76 has a leg element 78 projecting outward from the outside surface 74. The keys 76 are disposed collaterally and generally parallel to each other. The leg elements 78 are each narrower than the keyhole slots 56. The keys 76 each have a top element 80 attached to the leg element 78. The top elements 80 are flat and disposed generally parallel to the key plate outside surface 74. the top elements 80 are each larger than each keyhole slot 56 and smaller than each keyhole enlarged portion 54. Thus, the top elements 80 will fit through the keyhole enlarged portions 54, but will not fit through the keyhole slots 56. The key plate 70 has a lug 82 extending generally perpendicularly from the outside surface 74. The lug 82 has at least one hole 84 therethrough, the hole size being sufficient to accommodate a padlock 65. Typically, the lug 82 will also have two additional, smaller holes 86 for fasteners.

Thus, upon mounting the instrument 9 on the bracket 10, the key plate 70 will first be attached to the instrument 9. The key plate outside surface 74 will then be brought into juxtaposition with the web plate outside surface 50. The key top elements 80 will pass through the keyhole enlarged portions 54, and the key plate lug 82 will pass through the web plate aperture 68. The key leg elements 78 will then slidingly engage the keyhole slots 56 from the proximal end 58, and slide downward toward the distal end 60. At the same time, the key plate lug 82 will move downward into juxtaposition with the web plate lug 62 such that the padlock holes 64 and 84 through each lug will become generally aligned for installation of a padlock. The fastener holes 66 and 86 will also become generally aligned for installation of screws (not shown) to securely hold the key plate 70, and thereby the instrument 9, onto the support member 42.

The support member flanges 44 are juxtaposed against the intermediate member flanges 28 in a partly overlapping position, as shown in FIG. 1. The support member flanges 44 and the intermediate member flanges 28 include a second arcuate slot 88 having a second arc center. The second arcuate slot 88 can be disposed in one or both of the support member flanges 44, or in one or both of the intermediate member flanges 28, or in all four flanges.

Figure 5:
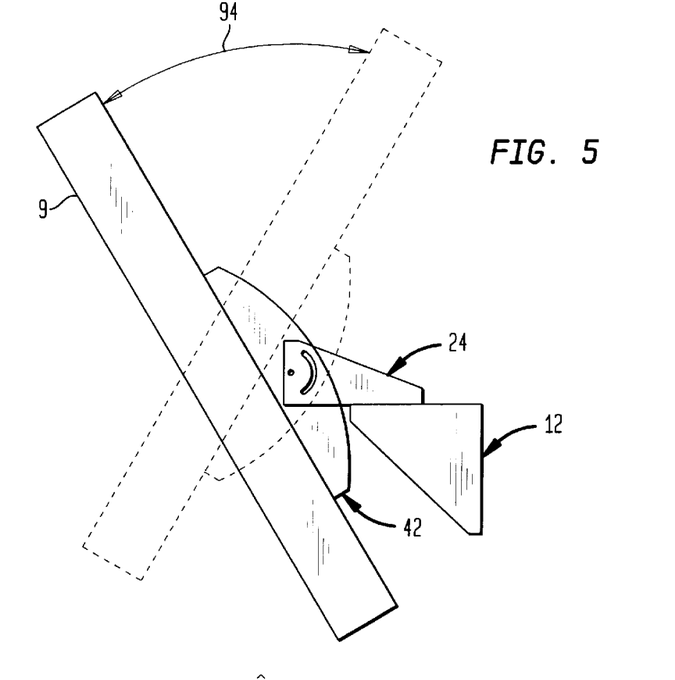
FIG. 5 is a side elevational view of the multiple axis bracket of FIG. 1 with an instrument mounted thereon, and pivoting within the second plane.

A second pivotal means is provided for pivotal attachment of the support member flanges 44 to the intermediate member flanges 28. Typically, the second pivotal means includes a second pivot fastener 90, which is shown as two screws with washers. The second pivot fastener 90 pivotally attaches the support member flanges 44 to the intermediate member flanges 28 at the second arc center. In this manner, the support member 42 will be pivoted in a second plane parallel to the flanges 44 and generally perpendicular to the first plane, as shown by arrow 94 in FIG. 5. A second locking fastener 92 slidingly engages the second arcuate slot 88 and releasably locks at least one of the intermediate member flanges 28 to at least one of the support member flanges 44. This allows adjusting a support angle of the support member 42 with respect to the intermediate member 24 and selective locking of the support angle.

Figure 2:
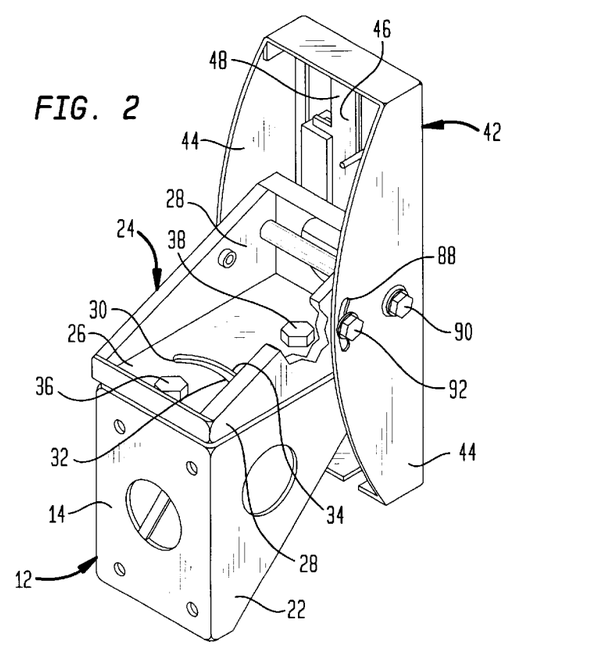
FIG. 2 is a perspective view of the multiple axis bracket of FIG. 1 in the retracted position.

The intermediate member 24 is movable from the extended position shown in FIG. 1, to a retracted position as shown in FIG. 2. In the retracted position, the intermediate member lower plate 26 is juxtaposed against the base member base plate 16 in the generally fully overlapping retracted position so as to conserve space. In the retracted position, the intermediate member lower plate 26 does not pivot with respect to base member base plate 16 as it can in the extended position. The retracted position is thus used where the pivoting in two directions is unnecessary, and space is limited. In the retracted position, the support member flanges 44 are still able to pivot with respect to the intermediate member flanges 28. In the retracted position, the lower plate 26 is attached to the base plate 16 adjacent the first and second ends thereof, by using the same pivot 36 and locking 38 fasteners.

Figure 4:
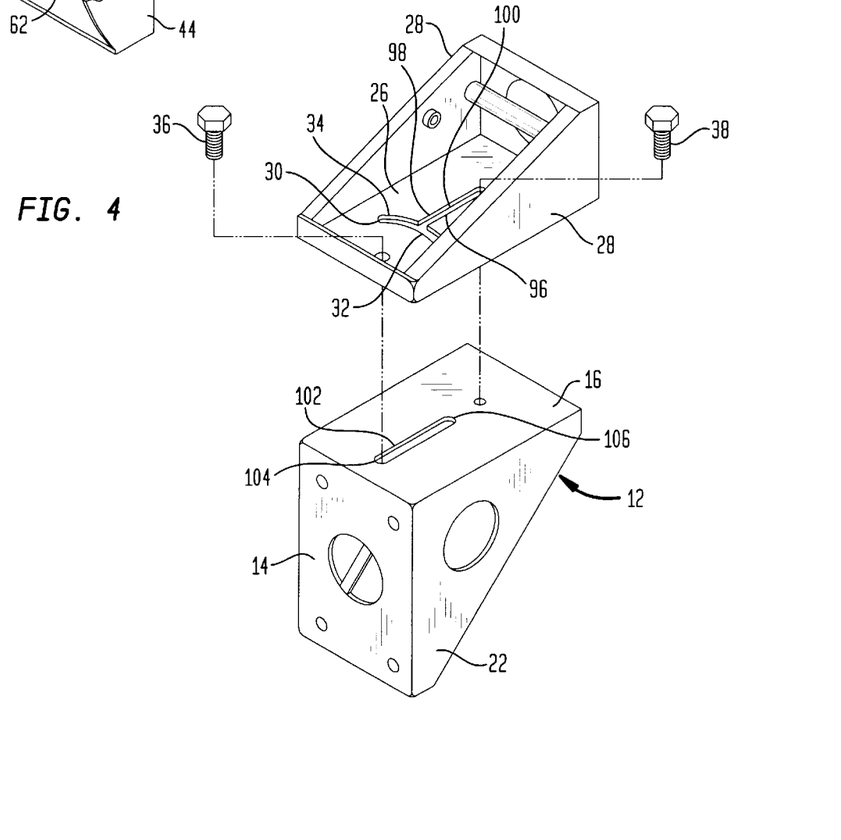
FIG. 4 is a perspective view of a base member and an intermediate member constructed in accordance with another embodiment of the invention.

Turning now to FIG. 4, as well as FIGS. 1 and 2, the lower plate 26 and the base plate 16 include a first linear slot 96 extending from a first end 98 communicating with the first arcuate slot convex edge 34 to an opposite second end 100. The first linear slot 96 is aligned with the first arc center. The combined first linear slot 96 and first arcuate slot 30 can be located either in the lower plate 26 or in the base plate 16.

The lower plate 26 and the base plate 16 include a second linear slot 102 extending from a first end 104 to an opposite second end 106. The second linear slot 102 is juxtaposed with the first arc center, and can be located either in the lower plate 26 or in the base plate 16.

Thus, in the retracted position, the first pivot fastener 36 will attach the lower plate 26 to the base plate 16 at the second linear slot first end 104, and the first locking fastener 38 will releasably lock the lower plate 26 to the base plate 16 at the first linear slot second end 100. Then, upon moving the intermediate member 24 from the retracted position shown in FIG. 2 to the extended position shown in FIG. 1, the first locking fastener 38 will be released, unlocking the lower plate 26 from the base plate 16. As the plates 26 and 16 slide apart, the first locking fastener 38 will slide from the first linear slot second end 100 to the first end 98 and enter the first arcuate slot 30. The first pivot fastener 36 will slide from the second linear slot first end 104 to the second end 106. The intermediate member 24 will be pivoted about the first pivot fastener 36 to adjust the base angle. The first locking fastener 38 will then be tightened, thereby locking the base angle and securing the intermediate member 24 to the base member 12 in the extended position.

Figure 7:
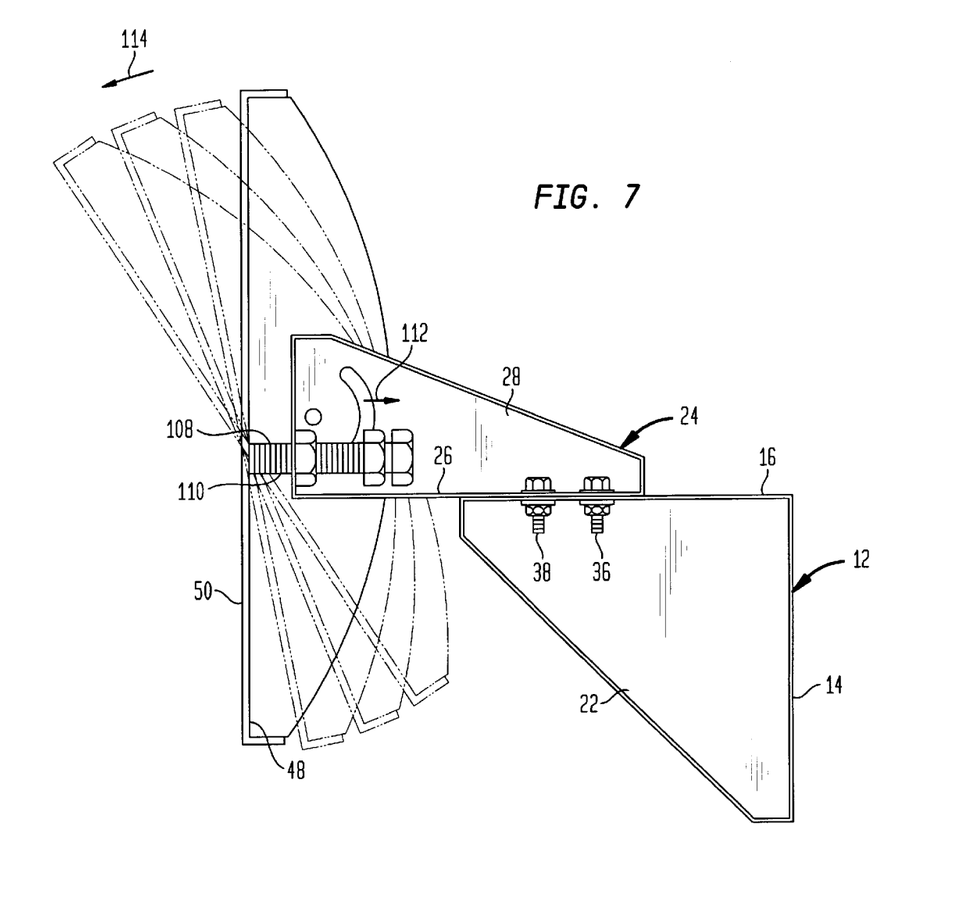
FIG. 7 is a side elevational sectional view of the multiple axis bracket of FIG. 1, taken along lines 7—7 of FIG. 8.
Figure 8:
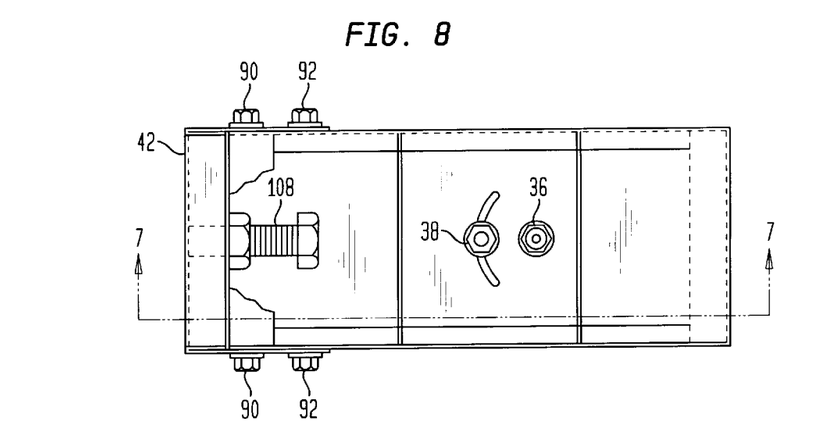
FIG. 8 is a top plan view of the multiple axis bracket of FIG. 7.

Referring now to FIGS. 7 and 8, an adjusting screw 108 is thread mounted on the intermediate member 24 and projects outward therefrom. A distal end 110 of the adjusting screw 108 bears against the support member 42 on the web plate inside surface 48. Thus, as the adjusting screw 108 is advanced in one direction, as shown by arrow 112 in FIG. 7, the support member 42 will be pivoted in a corresponding direction, shown by arrow 114. Conversely, as the adjusting screw 108 is advanced in an opposite direction, the support member 42 will be pivoted in a corresponding opposite direction, thereby providing screw adjustment of the support angle.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed:

1. A bracket for mounting an instrument upon a foundation, the bracket comprising:

a base member, the base member having a bottom plate for attachment to the foundation, and a base plate attached to the bottom plate and extending from a first end to an opposite second end;

an intermediate member, the intermediate member having a lower plate, and a pair of generally parallel flanges, spaced apart, and extending generally perpendicularly from the lower plate;

first pivotal means for pivotal attachment of the intermediate member lower plate to the base member base plate;

a support member, the support member having a pair of generally parallel flanges spaced apart;

second pivotal means for pivotal attachment of the support member flanges to the intermediate member flanges;

mounting means for mounting the instrument onto the support member; and an adjusting screw, thread mounted on the intermediate member and projecting outward therefrom, with an end of the adjusting screw bearing against the support member, so that as the adjusting screw is advanced in one direction, the support member will be pivoted in a corresponding direction, and as the adjusting screw is advanced in an opposite direction, the support member will be pivoted in a corresponding opposite direction, thereby providing screw adjustment of the support angle.

2. A bracket for mounting an instrument upon a foundation, the bracket comprising:

a base member, the base member having a bottom plate for attachment to the foundation, and a base plate attached to the bottom plate and extending from a first end to an opposite second end;

an intermediate member, the intermediate member having a lower plate, and a pair of generally parallel flanges, spaced apart, and extending generally perpendicularly from the lower plate;

first pivotal means for pivotal attachment of the intermediate member lower plate to the base member base plate;

a support member, the support member having a pair of generally parallel flanges spaced apart, the support member includes a web plate extending between the flanges, the web plate having an inside surface adjacent the flanges and an opposite outside surface, the web plate having a keyhole therethrough, the keyhole having an enlarged portion and a slot extending from a proximal end communicating with the enlarged portion to a distal end away from the enlarged portion, the web plate having a lug extending generally perpendicularly from the inside surface, the lug having at least one hole therethrough, the web plate having an aperture therethrough disposed alongside the lug;

second pivotal means for pivotal attachment of the support member flanges to the intermediate member flanges; and mounting means for mounting the instrument onto the support members, the mounting means includes a key plate for attachment to the instrument, the key plate having an inside surface and an opposite outside surface, the key plate having a key, the key having a leg element projecting outward from the outside surface, the leg element being narrower than the keyhole slot, the key having a top element attached to the leg element, the top element disposed generally parallel to the key plate outside surface, the top element being larger than the keyhole slot and smaller than the keyhole enlarged portion, the key plate having a lug extending generally perpendicularly from the outside surface, the lug having at least one hole therethrough; so that upon mounting the instrument on the bracket the key plate outside surface will be juxtaposed with the web plate outside surface, the key top element will pass through the keyhole enlarged portion, the key plate lug will pass through the web plate aperture, the key leg element will slidingly engage the keyhole slot from the proximal end toward the distal end, and the key plate lug will move into juxtaposition with the web plate lug such that the holes through each lug will become generally aligned.

3. A bracket for mounting an instrument upon a foundation, the bracket comprising:

a base member, the base member having a bottom plate for attachment to the foundation, and a base plate attached to the bottom plate and extending from a first end to an opposite second end;

an intermediate member, the intermediate member having a lower plate, and a pair of generally parallel flanges, spaced apart, and extending generally perpendicularly from the lower plate, the intermediate member lower plate is juxtaposed against the base member base plate in a partly overlapping extended position, the lower plate and the base plate include a first arcuate slot having a first arc center, the first arcuate slot having a concave edge facing the arc center, and an opposite convex edge;

first pivotal means for pivotal attachment of the intermediate member lower plate to the base member base plate, the first pivotal means includes a first pivot fastener pivotally attaching the lower plate to the base plate at the first arc center, and a first locking fastener slidingly engaging the first arcuate slot and releasably locking the lower plate to the base plate, so as to allow adjusting a base angle of the intermediate member with respect to the base member and selective locking of the base angle;

a support member, the support member having a pair of generally parallel flanges spaced apart, the support member flanges are juxtaposed against the intermediate member flanges in a partly overlapping position, the support member flanges and the intermediate member flanges include a second arcuate slot having a second arc center;

second pivotal means for pivotal attachment of the support member flanges to the intermediate member flanges, the second pivotal means includes a second pivot fastener pivotally attaching the support member flanges to the intermediate member flanges at the second arc center, and a second locking fastener slidingly engaging the second arcuate slot and releasably locking one of the intermediate member flanges to one of the support member flanges, so as to allow adjusting a support angle of the support member with respect to the intermediate member and selective locking of the support angle; and mounting means for mounting the instrument onto the support member.

4. The bracket of claim 3, wherein:

the intermediate member is movable from the extended position to a retracted position in which the intermediate member lower plate is juxtaposed against the base member base plate in the generally fully overlapping retracted position; and in the retracted position, the lower plate is attached to the base plate adjacent the first and second ends thereof.

5. The bracket of claim 4, wherein:

the lower plate and the base plate include a first linear slot extending from a first end communicating with the first arcuate slot convex edge to a second end, the first linear slot being aligned with the first arc center;

the lower plate and the base plate include a second linear slot extending from a first end to a second end, the second linear slot being juxtaposed with the first arc center; so that in the retracted position the first pivot fastener will attach the lower plate to the base plate at the second linear slot first end, and the first locking fastener will releasably lock the base plate to the lower plate at the first linear slot distal end; and upon moving the intermediate member from the retracted position to the extended position the first locking fastener will be released, unlocking the lower plate from the base plate, the first locking fastener will slide from the first linear slot distal end to the proximal end and enter the first arcuate slot, the first pivot fastener will slide from the second linear slot first end to the second end, the intermediate member will be pivoted about the first pivot fastener to adjust the base angle, and the first locking fastener will be tightened, thereby locking the base angle and securing the intermediate member to the base member in the extended position.

6. A bracket for mounting an instrument upon a foundation, the bracket comprising:

a base member, the base member having a bottom plate for attachment to the foundation, and a base plate attached generally perpendicularly to the bottom plate and extending from a first end adjacent the bottom plate to an opposite second end;

an intermediate member, the intermediate member having a lower plate, and a pair of generally parallel flanges, spaced apart, and extending generally perpendicularly from the lower plate;

first pivotal means for pivotal attachment of the intermediate member lower plate to the base member base plate;

a support member, the support member having a pair of generally parallel flanges spaced apart, the support member including a web plate extending between the flanges, the web plate having an inside surface adjacent the flanges and an opposite outside surface, the web plate having a keyhole therethrough, the keyhole having an enlarged portion and a slot extending from a proximal end communicating with the enlarged portion to a distal end away from the enlarged portion, the web plate having a lug extending generally perpendicularly from the inside surface, the lug having at least one hole therethrough, the web plate having an aperture therethrough disposed alongside the lug;

a key plate for attachment to the instrument, the key plate having an inside surface and an opposite outside surface, the key plate having a key, the key having a leg element projecting outward from the outside surface, the leg element being narrower than the keyhole slot, the key having a top element attached to the leg element, the top element disposed generally parallel to the key plate outside surface, the top element being larger than the keyhole slot and smaller than the keyhole enlarged portion, the key plate having a lug extending generally perpendicularly from the outside surface, the lug having at least one hole therethrough;

second pivotal means for pivotal attachment of the support member flanges to the intermediate member flanges; so that upon mounting the instrument on the bracket the key plate outside surface will be juxtaposed with the web plate outside surface, the key top element will pass through the keyhole enlarged portion, the key plate lug will pass through the web plate aperture, the key leg element will slidingly engage the keyhole slot from the proximal end toward the distal end, and the key plate lug will move into juxtaposition with the web plate lug such that the holes through each lug will become generally aligned.

7. The bracket of claim 6, wherein:

the intermediate member lower plate is juxtaposed against the base member base plate in a partly overlapping extended position;

the lower plate and the base plate include a first arcuate slot having a first arc center, the first arcuate slot having a concave edge facing the arc center, and an opposite convex edge;

the first pivotal means includes a first pivot fastener pivotally attaching the lower plate to the base plate at the first arc center, and a first locking fastener slidingly engaging the first arcuate slot and releasably locking the lower plate to the base plate, so as to allow adjusting a base angle of the intermediate member with respect to the base member and selective locking of the base angle;

the support member flanges are juxtaposed against the intermediate member flanges in a partly overlapping position;

the support member flanges and the intermediate member flanges include a second arcuate slot having a second arc center; and the second pivotal means includes a second pivot fastener pivotally attaching the support member flanges to the intermediate member flanges at the second arc center, and a second locking fastener slidingly engaging the second arcuate slot and releasably locking one of the intermediate member flanges to one of the support member flanges, so as to allow adjusting a support angle of the support member with respect to the intermediate member and selective locking of the support angle.

8. The bracket of claim 7, wherein:

the intermediate member is movable from the extended position to a retracted position in which the intermediate member lower plate is juxtaposed against the base member base plate in the generally fully overlapping retracted position; and in the retracted position, the lower plate is attached to the base plate adjacent the first and second ends thereof.

9. The bracket of claim 8, wherein:

the lower plate and the base plate include a first linear slot extending from a first end communicating with the first arcuate slot convex edge to a second end, the first linear slot being aligned with the first arc center;

the lower plate and the base plate include a second linear slot extending from a first end to a second end, the second linear slot being juxtaposed with the first arc center; so that in the retracted position the first pivot fastener will attach the lower plate to the base plate at the second linear slot first end, and the first locking fastener will releasably lock the base plate to the lower plate at the first linear slot distal end; and upon moving the intermediate member from the retracted position to the extended position the first locking fastener will be released, unlocking the lower plate from the base plate, the first locking fastener will slide from the first linear slot distal end to the proximal end and enter the first arcuate slot, the first pivot fastener will slide from the second linear slot first end to the second end, the intermediate member will be pivoted about the first pivot fastener to adjust the base angle, and the first locking fastener will be tightened, thereby locking the base angle and securing the intermediate member to the base member in the extended position.

10. The bracket of claim 6, further comprising:

an adjusting screw, thread mounted on the intermediate member and projecting outward therefrom, with an end of the adjusting screw bearing against the support member, so that as the adjusting screw is advanced in one direction, the support member will be pivoted in a corresponding direction, and as the adjusting screw is advanced in an opposite direction, the support member will be pivoted in a corresponding opposite direction, thereby providing screw adjustment of the support angle.

11. A bracket for mounting an instrument upon a foundation, the bracket comprising:

a base member, the base member having a bottom plate for attachment to the foundation, and a base plate attached generally perpendicularly to the bottom plate and extending from a first end adjacent the bottom plate to an opposite second end;

an intermediate member, the intermediate member having a lower plate, and a pair of generally parallel flanges, spaced apart, and extending generally perpendicularly from the lower plate;

first pivotal means for pivotal attachment of the intermediate member lower plate to the base member base plate;

a support member, the support member having a pair of generally parallel flanges spaced apart, the support member including a web plate extending between the flanges, the web plate having an inside surface adjacent the flanges and an opposite outside surface, the web plate having two keyholes therethrough, the keyholes each having an enlarged portion and a slot extending from a proximal end communicating with the enlarged portion to a distal end away from the enlarged portion, the keyholes disposed collaterally and being generally parallel, the web plate having a lug extending generally perpendicularly from the inside surface, the lug having at least one hole therethrough, the hole size being sufficient to accommodate a padlock, the web plate having an aperture therethrough disposed alongside the lug;

a key plate for attachment to the instrument, the key plate having an inside surface adjacent the instrument and an opposite outside surface, the key plate having two keys, each key having a leg element projecting outward from the outside surface, the keys disposed collaterally and being generally parallel, the leg elements each being narrower than the keyhole slots, the keys each having a top element attached to the leg element, the top elements being flat and disposed generally parallel to the key plate outside surface, the top elements each being larger than each keyhole slot and smaller than each keyhole enlarged portion, the key plate having a lug extending generally perpendicularly from the outside surface, the lug having at least one hole therethrough, the hole size being sufficient to accommodate a padlock;

second pivotal means for pivotal attachment of the support member flanges to the intermediate member flanges; so that upon mounting the instrument on the bracket the key plate outside surface will be juxtaposed with the web plate outside surface, the key top elements will pass through the keyhole enlarged portions, the key plate lug will pass through the web plate aperture, the key leg elements will slidingly engage the keyhole slots from the proximal end toward the distal end, and the key plate lug will move into juxtaposition with the web plate lug such that the holes through each lug will become generally aligned for installation of a padlock.

12. The bracket of claim 11, wherein:

the intermediate member lower plate is juxtaposed against the base member base plate in a partly overlapping extended position;

the lower plate and the base plate include a first arcuate slot having a first arc center, the first arcuate slot having a concave edge facing the arc center, and an opposite convex edge;

the first pivotal means includes a first pivot fastener pivotally attaching the lower plate to the base plate at the first arc center, so that the lower plate will be pivoted in a first plane parallel to the base plate, and a first locking fastener slidingly engaging the first arcuate slot and releasably locking the lower plate to the base plate, so as to allow adjusting a base angle of the intermediate member with respect to the base member and selective locking of the base angle;

the support member flanges are juxtaposed against the intermediate member flanges in a partly overlapping position;

the support member flanges and the intermediate member flanges include a second arcuate slot having a second arc center; and the second pivotal means includes a second pivot fastener pivotally attaching the support member flanges to the intermediate member flanges at the second arc center, so that the support member will be pivoted in a second plane parallel to the flanges and generally perpendicular to the first plane, and a second locking fastener slidingly engaging the second arcuate slot and releasably locking one of the intermediate member flanges to one of the support member flanges, so as to allow adjusting a support angle of the support member with respect to the intermediate member and selective locking of the support angle.

13. The bracket of claim 12, wherein:

the intermediate member is movable from the extended position to a retracted position in which the intermediate member lower plate is juxtaposed against the base member base plate in the generally fully overlapping retracted position so as to conserve space; and in the retracted position, the lower plate is attached to the base plate adjacent the first and second ends thereof.

14. The bracket of claim 13, wherein:

the lower plate and the base plate include a first linear slot extending from a first end communicating with the first arcuate slot convex edge to a second end, the first linear slot being aligned with the first arc center;

the lower plate and the base plate include a second linear slot extending from a first end to a second end, the second linear slot being juxtaposed with the first arc center; so that in the retracted position the first pivot fastener will attach the lower plate to the base plate at the second linear slot first end, and the first locking fastener will releasably lock the lower plate to the base plate at the first linear slot second end; and upon moving the intermediate member from the retracted position to the extended position the first locking fastener will be released, unlocking the lower plate from the base plate, the first locking fastener will slide from the first linear slot second end to the first end and enter the first arcuate slot, the first pivot fastener will slide from the second linear slot first end to the second end, the intermediate member will be pivoted about the first pivot fastener to adjust the base angle, and the first locking fastener will be tightened, thereby locking the base angle and securing the intermediate member to the base member in the extended position.

15. The bracket of claim 11, further comprising:

an adjusting screw, thread mounted on the intermediate member and projecting outward therefrom, with a distal end of the adjusting screw bearing against the support member, so that as the adjusting screw is advanced in one direction, the support member will be pivoted in a corresponding direction, and as the adjusting screw is advanced in an opposite direction, the support member will be pivoted in a corresponding opposite direction, thereby providing screw adjustment of the support angle.

16. A bracket for mounting an instrument upon a foundation, the bracket comprising:

a base member, the base member having a bottom plate for attachment to the foundation, and a base plate attached to the bottom plate and extending from a first end to an opposite second end;

an intermediate member, the intermediate member having a lower plate, and a pair of generally parallel flanges, spaced apart, and extending generally perpendicularly from the lower plate;

first pivotal means for pivotal attachment of the intermediate member lower plate to the base member base plate;

a support member, the support member having a pair of generally parallel flanges spaced apart, the support member flanges are pivotally attached to the intermediate member flanges, wherein the support member includes a web plate extending between the flanges, the web plate having an inside surface adjacent the flanges and an opposite outside surface, the web plate having a keyhole therethrough, the keyhole having an enlarged portion and a slot extending from a proximal end communicating with the enlarged portion to a distal end away from the enlarged portion, the web plate having a lug extending generally perpendicularly from the inside surface, the lug having at least one hole therethrough, the web plate having an aperture therethrough disposed alongside the lug; and mounting means for mounting the instrument onto the support member, the mounting means includes a key plate for attachment to the instrument, the key plate having an inside surface and an opposite outside surface, the key plate having a key, the key having a leg element projecting outward from the outside surface, the leg element being narrower than the keyhole slot, the key having a top element attached to the leg element, the top element disposed generally parallel to the key plate outside surface, the top element being larger than the keyhole slot and smaller than the keyhole enlarged portion, the key plate having a lug extending generally perpendicularly from the outside surface, the lug having at least one hole therethrough; so that upon mounting the instrument on the bracket the key plate outside surface will be juxtaposed with the web plate outside surface, the key top element will pass through the keyhole enlarged portion, the key plate lug will pass through the web plate aperture, the key leg element will slidingly engage the keyhole slot from the proximal end toward the distal end, and the key plate lug will move into juxtaposition with the web plate lug such that the holes through each lug will become generally aligned.

* * * * *